United States Patent [19]

Hicks, Jr.

[11] Patent Number: 4,676,583

[45] Date of Patent: Jun. 30, 1987

[54] ADSCITITIOUS RESONATOR

[75] Inventor: John W. Hicks, Jr., Northboro, Mass.

[73] Assignee: Polaroid Corporation, Cambridge, Mass.

[21] Appl. No.: 729,647

[22] Filed: May 2, 1985

Related U.S. Application Data

[63] Continuation-in-part of Ser. No. 625,543, Jun. 28, 1984, which is a continuation-in-part of Ser. No. 331,052, Dec. 16, 1981, abandoned.

[51] Int. Cl.⁴ .......................... G02B 6/29; H01S 3/30; H01S 3/08
[52] U.S. Cl. .................... 350/96.15; 350/96.10; 350/96.29; 350/96.30; 350/96.16; 372/6; 372/92; 372/96; 372/97; 372/99
[58] Field of Search ............. 350/96.10, 96.11, 96.12, 350/96.15, 96.16, 96.20, 96.29, 96.30; 372/6, 69, 70, 71, 92, 96, 97, 98, 99, 108, 109; 331/155

[56] References Cited

U.S. PATENT DOCUMENTS

| | | | |
|---|---|---|---|
| 3,308,394 | 3/1967 | Snitzer et al. | 350/96.29 |
| 3,354,405 | 11/1967 | Bebb et al. | 331/94.5 |
| 3,406,358 | 10/1968 | Seidel et al. | 350/96.12 |
| 3,589,794 | 6/1971 | Marcatilli | 350/96.12 |
| 3,622,911 | 11/1971 | Marcatilli | 350/96.15 X |
| 3,760,297 | 9/1973 | Thompson | 350/96.15 |
| 4,136,929 | 1/1979 | Suzaki | 350/96.15 |
| 4,315,666 | 2/1982 | Hicks, Jr. | 350/96.15 |
| 4,342,499 | 8/1982 | Hicks, Jr. | 350/96.15 |
| 4,429,393 | 1/1984 | Giuliano | 372/21 |
| 4,447,117 | 5/1984 | Bobb | 350/96.15 |
| 4,469,397 | 9/1984 | Shaw et al. | 350/96.15 |
| 4,473,270 | 9/1984 | Shaw | 350/96.15 |
| 4,546,476 | 10/1985 | Shaw et al. | 350/96.15 |
| 4,553,238 | 11/1985 | Shaw et al. | 350/96.15 |
| 4,592,043 | 5/1986 | Williams | 370/3 |
| 4,630,885 | 12/1986 | Haavisto | 350/96.15 |

FOREIGN PATENT DOCUMENTS

| | | | |
|---|---|---|---|
| 54-116951 | 9/1979 | Japan | 350/96.15 |
| 55-103509 | 8/1980 | Japan | 350/96.15 |

OTHER PUBLICATIONS

EP published Abstract of U.S. Appln. S.N. 448,707, filed 12/10/82, published 6/27/84.
Haavisto et al, "Resonance Effects in Low-Loss . . . ", Optics Lett., vol. 5, No. 12, 12/80 pp. 10–12.

Primary Examiner—William L. Sikes
Assistant Examiner—Brian M. Healy
Attorney, Agent, or Firm—Francis J. Caufield

[57] ABSTRACT

An optical fiber structure having resonant characteristics useful for coupling to an optical transmission line for removing selected wavelengths of light energy includes a light guiding structure, such as an optical fiber waveguide, which conditionally operates as a resonant cavity responsive to resonance of at least one other resonant cavity. In one embodiment, an extrinsically defined or adscititious reflectance is formed in the waveguide segment by laterally coupling an etalon cavity to the waveguide segment. In another embodiment, the waveguide segment is coupled to one or more resonant loops to form a conditional resonant loop cavity which includes the other loops. The resonant wavelength spacing for the conditional cavity and its cooperating resonant cavity are made different from one another with only one wavelength coresonantly supported in both cavities. In operation, the structure is coupled to a multi-channel optical transmission line for selectively removing a portion of the energy of a desired channel by resonating the desired wavelength in both the conditional cavity and its cooperating resonant cavity. Additionally, an active gain material can be provided in the conditional cavity and pumped by a pumping source to increase the gain of the desired wavelength.

13 Claims, 8 Drawing Figures

ADSCITITIOUS RESONATOR

CROSS REFERENCE TO RELATED APPLICATIONS

The present application is a continuation-in-part of U.S. application Ser. No. 625,543, filed June 28, 1984 which is, in turn, a continuation-in-part of the now abandoned U.S. application Ser. No. 331,052, filed Dec. 16, 1981.

BACKGROUND OF THE INVENTION

This invention relates to resonant cavities for waveguide systems. More particularly, it concerns resonant multicavity optical circuits especially suited for removing selected wavelength-distinct channels of light energy propagated in an optical waveguide in a manner that minimizes loss of energy from other channels in the waveguide and for providing enlarged free spectral range in the passby function, that is, the ratio of the electric field passed by a channel-removing tap to the electric field approaching the tap.

In the above-noted parent application Ser. No. 625,543, several embodiments of resonant cavity filter devices are disclosed for tapping spectral line widths as narrow as 0.01 Angstrom from an optical waveguide or fiber propagating many relatively broad bandwidth signals modulating light energy in the 1 to 2 micron region of the electromagnetic spectrum. As pointed out in that application, a principal objective in the removal of very narrow line widths from an optical waveguide trunk is the potential for the realization of an optical communications system in which a large number of information channels may be transmitted along a single optical waveguide trunk with a facility for tapping discrete channels at successive taps or branch lines along the trunk. It is also recognized that the number of successive taps on a single trunk is limited principally by the removal of energy from side channels by upstream taps whose purpose is to remove only one channel.

Certain of the embodiments disclosed in the aforementioned co-pending application employ so-called serial resonant cavities tuned in what is termed a vernier or coresonant relationship so that only one channel is coresonant in each of the serial resonant cavities, thus reducing or eliminating energy removed from the side orders of the desired coresonant channel. The narrow line wavelengths of interest are passed to a first resonant cavity in which the line width of interest is resonated along with side orders of the line width of interest. The second resonant cavity is coupled to the first resonant cavity and tuned to include the line width of interest, but with side orders at different spectral intevals than those of the first resonant cavity so only the line width of interest will be coresonant in both cavities. In this manner, only the desired, coresonant channel will be available at the output of the second resonant cavity.

Although these serial cavities demonstrate great potential for the selective tapping of very narrow line widths of light energy from an optical waveguide, the approach is restricted by the light energy loss accumulating after successive taps from a trunk. That is, these resonant taps, while effective in removing selected wavelength-distinct channels, do reduce the transmission energy of the wavelengths that are side orders of the selected wavelength.

Additionally, the parent application also describes an embodiment which provide integral dual cavities in which one cavity is completed by a path through a second cavity. The latter arrangement not only provides the above-noted vernier effect to pass only the selected wavelength to the branch line, but also improves the passby function as subsequently explained in detail in the present application.

SUMMARY OF THE INVENTION

Briefly, in accordance with the present invention, a resonant waveguide cavity is provided by a waveguide structure having at least one waveguide segment which in part defines a first resonant cavity in accordance with or by virtue of one or more additional resonant cavities to which the segment is coupled. Advantageously, the extrinsically defined first cavity is conditional upon and spontaneously operates only at the coresonant frequency of both cavities, such that side orders are severely attenuated or even eliminated from the conditional cavity, and extraction of transmission line energy by such side orders is minimized.

The coupling between the waveguide segment and the second cavity is an evanescent field coupling and its location determines the effective optical length of the conditional cavity and the latter is initialy configured and/or tuned to coresonate at only one wavelength common to the second cavity.

In a specific embodiment, an extrinsically defined cavity, hereinafter called an adscititious resonant cavity, is formed in an optical waveguide segment by terminating one end of the segment with a real mirror and forming an adscititious reflectance within the segment to cooperate with the real mirror to provide the resonant characteristics. The adscititious reflectance is established in the waveguide segment by a second resonant cavity laterally coupled to the segment with the adscititious reflectance formed within the region of the lateral couple only when the second cavity is resonant and only at the resonant wavelengths of the latter. The second cavity may be formed from a length of optical waveguide bounded by mirrors to provide the desired resonant mode characteristics.

The adscititious cavity may further include an active gain material pumped by a source of light energy to increase the gain of the wavelength resonantly supported in the adscititious cavity. The two cavities, real and adscititious, are vernier-tuned so only selected coresonant channels are removed from the trunk. Thus, both the passby function and transfer function have enlarged free spectral range.

In another form of the invention, a waveguide segment can be extrinsically provided with resonant characteristics by respective second and third resonant cavities laterally coupled to the segment to define cooperating adscititious reflectances therein. Additionally, a conditional resonant cavity can be formed in an optical waveguide segment that follows a curvilinear path by forming a closed resonant waveguide ring or loop laterally coupled, in two lateral coupling zones, across the curvilinear segment to create loop resonant characteristics in the segment.

In another embodiment, a pair of closed resonant loops or ring cavities are respectively coupled across a pair of spaced waveguide segments to provide (at resonance of the loop cavities) a conditional loop cavity extending through a first of the loops along a first of the segments to the second loop, and through the latter and along the second segment back to the first loop.

Accordingly, a principal object of the present invention is the provision of a cavity arrangement operable at only a few or a single wavelength. Another principal object is the provision of resonant multicavity optical devices by which a specific resonant line of light may be removed from an optical waveguide with minimal attenuation of the side orders and, if desired, amplified. Other objects and further scope of applicability will be apparent from the detailed description to follow taken in conjunction with the accompanying drawings in which like parts are designated by like reference characters.

DESCRIPTION OF THE PREFERRED EMBODIMENT

Figure 1:
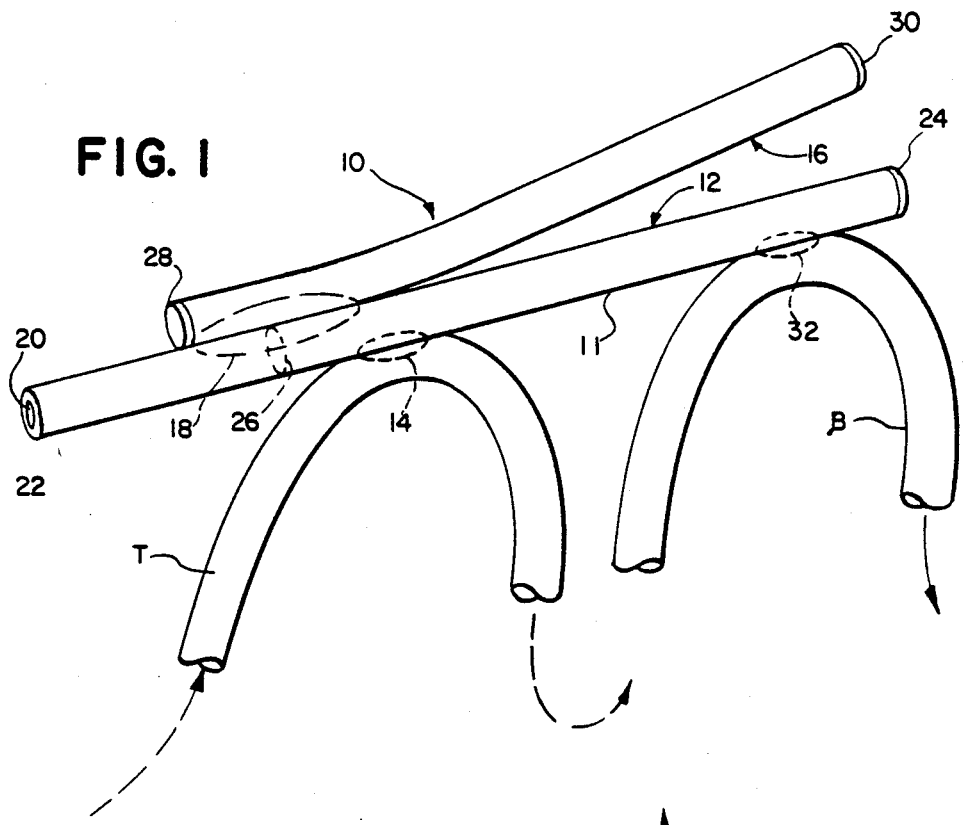
FIG. 1 is a perspective representation of an optical fiber waveguide arrangement defining a dual cavity structure including a cavity having an extrinsically defined resonance for removing a selected spectral line from an optical transmission line.

A multicavity optical circuit in accordance with the present invention is illustrated in FIG. 1 and designated generally therein by the reference character 10. The circuit 10 is designed to be coupled to a trunk or transmission line T that is part of a communications system and which can carry a large number of closely spaced information-bearing wavelengths, typically in the 1.34 or 1.5 micron regions of the electromagnetic spectrum. The circuit 10 removes a portion of the spectral energy from the transmission line T' with the residual or remainder of the energy, termed here as "P", continuing in the transmission line. The spectral energy removed from the transmission line T can be presented by a utilization device (not shown) by way of branch fiber B.

The circuit 10 includes an adscititious resonant cavity 12 coupled to the transmission line T, through an evanescent field or lateral couple 14, to a second resonant cavity 16 through a lateral couple 18 and to the branch fiber B through a lateral couple 32. The resonant cavity 12 is termed a conditional cavity, and more specifically in this embodiment, an adscititious cavity because the resonant characteristics which make it a cavity are conditional upon and defined by something extrinsic to this cavity. In the present embodiment, the adscititious cavity 12, as will be explained in more detail below, while an actual cavity only exists when it is completed by, or closed by, a reflectance or mirror formed by the transfer function in the second cavity 16. Thus, the term adscititious will be used herein when reference is made to cavities, loops, or mirrors etc. which are derived from, or acquire their properties from, something extrinsic to themselves.

For an understanding of the adscititious cavity 12, it should be first noted that as illustrated it consists of an optical waveguide or fiber segment 11 having, for example, a core and cladding 20 and 22, and bounded at one end by a reflecting arrangement such as a real mirror 24. The second resonant cavity 16 is a linear cavity such as an etalon defined by a length of optical waveguide such as an optical fiber bounded at opposite ends by reflecting arrangements such as real mirrors 28 and 30.

The adscititious cavity 12 has physical characteristics such as a selected length that enable it to resonate at the wavelength of interest. As is known, a linear cavity will preferentially resonate at wavelengths that are an integral number of half-wavelengths of the effective optical length of the cavity. The adscititious cavity 12 is closed, or that is, formed or defined in the waveguide segment 11 by an adscititious reflectance or mirror 26 provided only at the resonant wavelengths or resonant lines of the second cavity 16. If the length of the adscititious cavity (the distance between its real mirror 24 and the location of the couple 18, forming the adscititious mirror 26) is selected to support a wavelength at or near one of the resonant lines of the second cavity, the adscititious cavity becomes a resonant cavity at that common line.

Where losses in the resonant structures are maintained very low, only the single coresonant line will resonate in the adscititious cavity and the passby function is preserved. With moderate losses, some side orders also resonate in the cavity 12. However, since these side orders are of reduced number, the passby function is still improved. Consequently, it should be understood that where a single resonant wavelength is referred to in the specification, the system may in fact include a few side orders.

As can be appreciated, the adscititious cavity 12 preferentially removes energy from the transmission line T only at the wavelength of interest, and tends to discriminate against removal of wavelengths above and below the wavelength of interest. The filtered wavelength is removed to branch line B, preferably at couple 32 or from the etalon 200 by means of a different branch line, not shown.

As discussed in the parent application, the effective optical length of a given cavity can be adjusted by heating, stretching or stressing a portion of the waveguide forming the cavity. To provide the vernier arrangement, or so-called vernier tuning, slightly shifted but otherwise similar resonant combs are often desired. The actual mechanical length of the waveguides forming the multiple cavities may, for convenience, be constructed with lengths close to or substantially equal to the other, but with one cavity being heated or stressed differently than the other to provide a controlled, slightly different optical path length in each of the cavities. Consequently, it should be understood that the lengths of the cavity waveguides presented in the examples given below, which are often approximately equal, refer only to the rough mechanical length, with the optical length of one cavity being adjusted with respect to the other by, for example, heating.

The adscititious cavity 12 is weakly or lightly coupled to the transmission line T through the lateral coupling 14 in such a manner that only a small portion of the energy in the transmission line, for example 1-10%, but preferably about 2%, is passed through the lateral coupling 14 into the waveguide segment 11 (forming the adscititious cavity 12) if the segment were an open circuit. The lateral coupling 18 between the segment 11 and the second cavity 16 preferably is more strongly or heavily coupled and has a substantial coupling coefficient that is between about 20% and 50%. Since the second cavity 16 may have high loss because of the poor mirror reflectivity that can be obtained, the adscititious reflectance 26 will have a transfer function at peak resonance of no more than about 90-95%.

The second cavity 16 is a linear cavity functionally defined as a Fabry-Perot etalon equivalent by the two mirrors 28 and 30 and will resonate at wavelengths that are an integral number of half-wavelengths of the effective optical length of the cavity. As previously indicated, the second cavity 16 is preferably designed to resonate at a different set of wavelengths from those of the adscititious cavity 12, but with one wavelength, the desired wavelength for the particular branch line B, being a common wavelength of resonance for both cavities. For example, a heating element (not shown) may be affixed to either cavity 12 or 16 to adjust the effective optical path of one cavity to the other. This wavelength selection function, in which the intentionally different sets of resonant lines of the adscititious cavity 12 and the second cavity 16 have only one resonant line in common is termed coresonant vernier tuning. A complete disclosure of coresonance is presented in the above-noted parent application, Ser. No. 625,543, the disclosure of which is incorporated herein by reference.

One of the advantages of the present invention is that an enlarged free spectral range is provided in the passby function. As defined therein, the "passby function", that is, the ratio E passby/E input, is the ratio of the electric field that passes by a tap to the electric field that approaches the tap. The term "transfer function", that is, the ratio E output/E input, is the ratio of the electric field at the output of the tap to the electric field that approaches the tap. In the present context, the resonant multicavity circuit 10 of FIG. 1 functions as the tap on the line T. The electric field in a waveguide can be defined in terms of amplitude and phase. The amplitude at a downstream point is related to the amplitude at an upstream point by the product of all transmission, gain, and coupling factors between the two points. The phase is related by the summation of all phase delays or shifts between the two points.

Dimensions for a particular device depend upon wavelength of the light to be resonated and, as previously noted, it is intended that the effective optical length of each cavity will be tuned, or that is, defined during or after construction. For an exemplary device operating in the 1.0-1.5 micron region of the electromagnetic spectrum, a useful set of parameters is as follows:
a. the length of the fiber forming the cavity 12, from midpoint of couple 18 to the mirrored end 24 is 1 cm;
b. the length of the fiber forming the linear cavity 16 from midpoint of couple 18 to the mirrored end 30 is 1 cm;
c. the strength of couple 14 is 2%;
d. the strength of couple 32 may-be chosen to be from 1% to approximately 50%, remembering that the pump is adjusted. As explained below, amplification may be employed in the cavity 12 to provide gain of twice the chosen amount plus enough additional to achieve the desired circuit Q. However, it should also be borne in mind that light exits in both directions onto the branch line B;
e. the energy reflection of mirrors 24, 28 and 30 is approximately 97%;
f. the length of couple 18 is 2 mm; and
g. the overall length of the fiber forming the linear cavity 16 is the length indicated in "b" above plus one half the length of the couple 18, or that is, 1.1 cm.

As explained in more detail with regard to FIG. 1, gain may be advantageously provided in the optical circuit 10 to amplify the resonant wavelength. Thus, the optical waveguide segment 11 that includes the adscititious cavity 12 can be doped with an active gain or lasing media that absorbs light energy at one or more absorbing wavelengths and emits light at another emitting wavelength or wavelengths that include the wavelengths removed from the transmission line T in the manner described in the parent application. Exemplary gain materials include neodymium, terbium and erbium. The concentration of the gain providing dopant in the host material can vary from a lower limit determined by the minimum gain required for a particular application and an upper limit determined by concentration quenching within the adscititious cavity 12. In general, a concentration range of between 0.1 and 30% (by weight) is suitable.

A pumping source, such as a laser diode, is provided having a light output at a wavelength within the absorption spectra of the active material, viz., 0.78-0.88 microns where the gain material is neodymium. The light source is end coupled to the optical fiber segment 11 so that the pumping light is directed into the active core region of the adscititious cavity 12. As the pumping light energy from the light source enters the adscititious cavity, the gain material absorbs photons with concomitant increases in electron energy states. Where gain is employed in the structure of the above-noted example, the length of access, that is the length of the waveguide segment 11 extending beyond the adscititious mirror 26 to the waveguide end, should be long enough to adequately couple into the pump system. It should be noted, however, that extra introductory length will waste power, and that if a lens is utilized to couple the pump power into the waveguide segment, the end of the segment 11 can be flush with the end of the couple 18 such that the length of the segment 11 would be 1.1 cm, with the 0.1 cm extending beyond the adscititious mirror 26 providing the access length for the pump. As later explained in detail in regard to FIG. 4, the extracted bandwidth may also be varied in the novel arrangement by varying the pump power.

Figure 2:
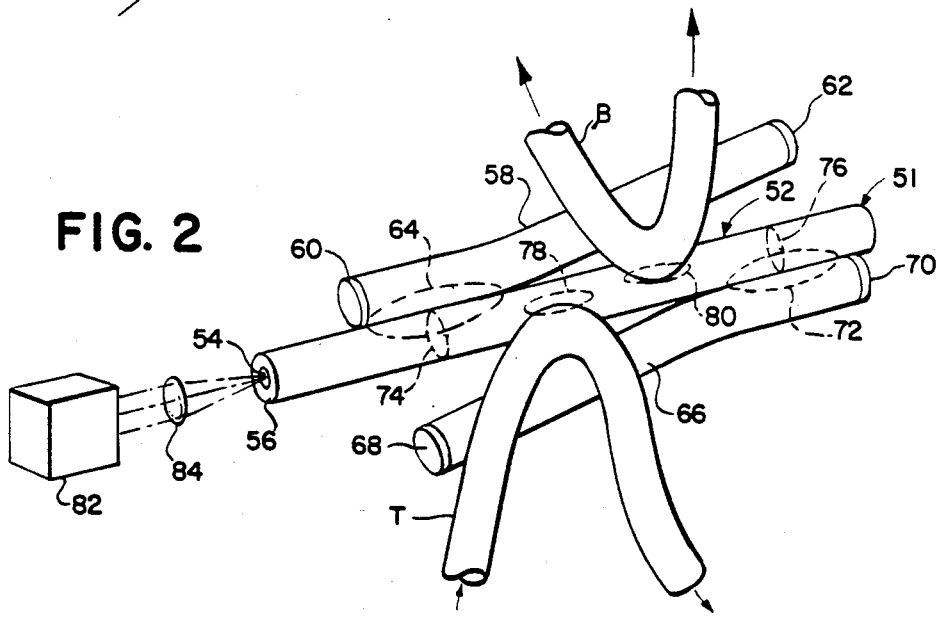
FIG. 2 is a perspective representation of an optical fiber structure defining a three cavity structure for likewise removing a selected spectral line from an optical fiber transmission line.

In a second embodiment of the conditional circuit, illustrated in FIG. 2, an adscititious cavity 52 is formed within an optical waveguide segment 50 by virtue of two adscititious reflectances 74 and 76. The segment 50 includes a core 54 and a cladding 56 for confining light energy to the core. A first linear cavity 58, defined by a length of optical waveguide bounded by mirrors 60 and 62, is laterally coupled at 64 to the segment 50 and a second linear cavity 66, defined by a length of optical fiber bounded by mirrors 68 and 70, is laterally coupled at 72 to the segment 50 and the adscititious cavity 52. As explained below, the first cavity 58 operates to functionally create a mirror-like adscititious reflectance 74 in the segment 50 in the region of the lateral couple 64, and the second cavity 66 operates to functionally create another mirror-like adscititious reflectance 76 in the region of the lateral couple 72. These adscititious reflectances 74 and 76 operate to define the adscititious resonant cavity 52 within the waveguide segment 50. An input line or transmission line T is laterally coupled at 78 to a portion of the segment 50 within the length forming the adscititious cavity 52 to form an input couple to the circuit and a tap or branch line B is likewise coupled to another portion of the adscititious cavity through a lateral couple 80 to form an output couple. As illustrated, the input couple 78 and the output couple 80 are spaced from each other and the couples 64 and 72.

In operation, the transmission line T carries a large number of wavelength-distinct spectral lines. The resonant cavities 58 and 66 have characteristic resonant lines and operate to functionally create the adscititious reflectances 74 and 76 within, respectively, the regions of the lateral couplings 64 and 72 to define the length or, that is, the resonant chracteristics of the adscititious cavity 52. The effective optical length of the latter being determined by the spacing between the couples 64 and 72 will preferentially support only selected wavelengths, including the wavelength of interest, in common with the other cavities.

Consequently, a three resonant cavity Fabry-Perot circuit is illustrated in FIG. 2 and comprises an adscititious resonant cavity 52 terminated by the adscititious reflectances formed by the etalons or real resonant cavities 58 and 66. The lateral coupling 78 between the transmission line T and the adscititious cavity 52 is relatively weak, that is, between 1-10%, with a 2% coupling being preferred, so that only a small portion of the optical energy in the transmission line T is laterally coupled into the segment 50 which forms the adscititious cavity 52. The losses associated with the mirrored ends of cavities 58 and 66 are not negligible and hence even a large (approximately 0.7) couple into each of them fails to provide a very high adscititious reflectivity in the waveguide segment 50. This results in a relatively low finesse as well as relatively low energy transfer efficiency into the branch B. The relatively low finesse of the adscititious cavity 52 considered separately does not, however, prevent a high finesse and narrow spectral line for the overall circuit and does not prevent covering a large spectrum with minimized side orders, as a result of the double Vernier effect referred to previously. If the finesse of cavity 52 needs to be raised, a neodymium doped core (or cladding) may be used for the segment 50 and pumped from one end as explained below.

Where it is desired to provide gain, the core 54 and/or the cladding 56 of the waveguide segment that contains the adscititious cavity 52 can be doped with an active gain or lasing material which absorbs light energy at one or more absorbing wavelengths and emits light at different emitting wavelength or wavelengths. The preferred gain material is neodymium, although other rare earth materials such as terbium or erbium are likewise suitable. The concentration of the gain material in the host glass may vary from a lower level determined by the minimum gain required for a particular application and an upper limit determined by concentration quenching. In general, a concentration range between 0.1 and 30% by weight is suitable. A laser diode 82, the source of pumping light energy for the gain material, is selected to have a light output at a wavelength within the absorption spectra of the particular gain media employed, such as 0.78-0.88 microns where the gain media is neodymium. The light energy output of the laser diode 82 can be passed through a lens 84 to direct the light into the core 54 of the waveguide segment 50 that incorporates the adscititious cavity 52. As the light energy from the laser diode 82 enters the adscititious cavity 52, the gain media absorbs photons with concomitant increases in electron energy states. Depending upon the active gain material utilized, spontaneous emission can occur across a material-specific emission spectra. Where neodymium is utilized as the gain media, spontaneous emission occurs in regions of 1.06 and 1.34 microns. Thus, where the spectral line preferentially resonated within the adscititious cavity 52 falls within the spontaneous emission spectra of the gain material, the resonantly supported wavelength will stimulate excited atoms of the gain material to provide in-phase emissions that increase the energy content of the resonantly supported spectral wavelength. Accordingly, the gain-increased wavelength can then be coupled through the lateral couple 80 to the branch line B for transmission to the utilization device.

Useful parameters for the three cavity structure of FIG. 2 are as follows:
 a. the length of cavity 52, from adscititious mirror 74 to adscititious mirror 76 is approximately 1 cm;
 b. the length of cavities 58 and 66 from center of couples 64 and 72, respectively, to their remote ends 62 and 68 is 0.9 cm;
 c. the overall length of cavities 58 and 66 between their mirrored ends is 1 cm;
 d. the minimum length of waveguide segment 50, from point flush with mirrored end 60 of cavity 58 to point flush with mirrored end 70 of cavity 66 is 1 cm;
 e. the strength of input couple 78 is 2%;
 f. the length of input couple 78 is 0.1 to 0.2 cm;
 g. the strength of output couple 80 is 20 to 50%;
 h. the length of output couple 80 is 0.1 to 0.3 cm;
 i. the strength of each of the cavity couples 64 and 72 is approximately 50%; and
 j. the length of each of the cavity couples 64 and 62 is 0.2 cm.

A three cavity structure as illustrated in FIG. 2 may be made in the following manner. The etalons or cavities 58 and 56 may be constructed by grinding and polishing the ends of 1 cm lengths of optical waveguide fiber comprising a germania doped silica core and silica cladding with a ratio of cladding-to-core of 10/1. Each end is then encapsulated in a plastic material resistant to hydrofluoric acid (HF) and having an index of refraction less than that of the cladding and the exposed portions of the fibers are then etched in HF down to a cladding-to-core ratio of 3/1. The adscititious cavity segment 50 is provided from a 1 cm length of optical waveguide fiber having a silica core doped with germania and neodymium, a silica cladding, and an index of refraction and a numerical aperture equal to the fiber of cavities 58 and 60. The segment 50 is etched to a cladding-to-core ratio of 3/1. A trunk line can be provided by etching a standard silica waveguide fiber having a germania doped core, down to a 3/1 cladding-to-core ratio in the trunk region which is to be coupled. Finally, a branch line may be prepared by etching the coupling end of a standard germania doped silica fiber down to a ratio of 1.6/1.

Then, using either a $CO_2$ laser beam or arc, each etalon is laterally fused to the waveguide segment 50 near its opposite ends while taking care not to burn the plastic in which the nearby end of each etalon is encased. Sufficient heating is provided to bring the inter-core distance at the etalon couples down to 1.3 diameters with the couple length being 2 mm. The etched section of the trunk fiber is glue-coupled to the waveguide segment 50 away from, but between the etalon-to-waveguide couples, for a length of 2 mm to provide an approximately 2% couple from the trunk, and the etched end of the branch line is also coupled to the segment (between the etalon couples and away from both the latter and the trunk couple) for a length of 1.1 mm to provide a 50% couple to the branch.

An exemplary method for constructing the optical circuit of FIG. 2 is illustrated in FIGS. 5-8. In the method, a preform body 180 is first formed of cladding material such as fused silica and three grooves 182, 184 and 186, longitudinally formed in one major surface 188 of the body by slot cutting, for example. Three fiber preforms 50a, 58a and 66a are placed within the grooves; the preforms 50a, 58a and 66a embodying a germania doped silica core and silica cladding of proper proportion such that when drawn down (FIG. 6) will provide fibers 50, 56 and 58 having a cladding-to-core ratio of 3/1. As noted in the prior example, the preform 50a includes neodymium in its core for providing gain. As illustrated, the preform 50a is located in the center groove 184 between 56a and 58a and an additional groove 190 is located in the opposite side 192 of the body 180 in general alignment with the groove 184.

Figure 6:
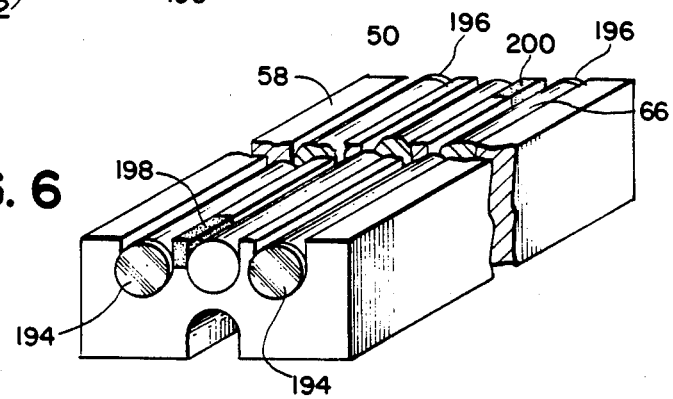
FIG. 6 is a view in perspective of an optical cane drawn from the preform of FIG. 5.

The assembled preform 180 is drawn down to a cane assembly 181, shown in FIG. 6, wherein the underclad fibers 50, 58 and 66 are presented. The cane is cut and polished to a suitable length, for example 1 cm, and the ends of fibers 58 and 66 reflectively coated as at 194 and 196 to form linear cavities thereof. A portion of the groove wall separating fibers 58 and 50 at one end thereof is removed by slot cutting or etching, etc., and filled with high index material 198 to couple the fiber 58 to the fiber 50. In a similar manner, at the opposite end of the fiber 50 from its coupling to the fiber 58, the separating wall between fiber 50 and fiber 66 is removed and filled with high index material 200 to couple these fibers. In this regard, the grooves 182, 184 and 186 are spaced in the preform body to produce appropriate wall thickness in the drawn cane which, when replaced by the high index material, will provide a suitable coupling between the etalon and adscititious cavity as set forth in the prior example.

Figure 7:
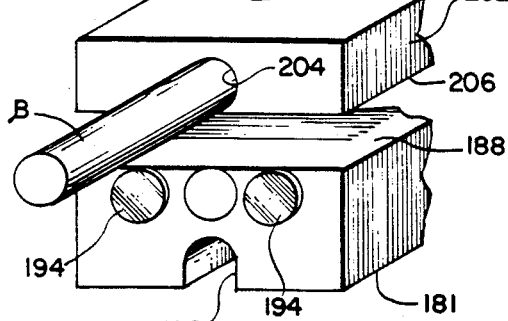
FIG. 7 illustrates an assembly of the cane of FIG. 6 with a branch line.
Figure 8:
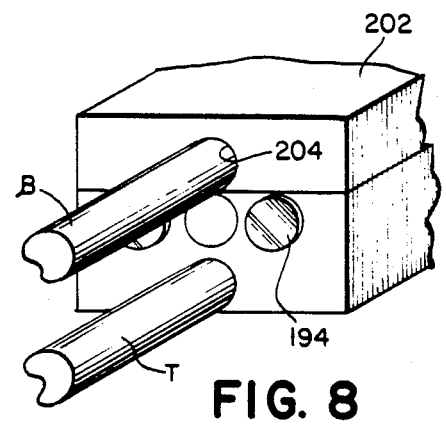
FIG. 8 illustrates a completed unitary structure of the multiple cavity embodiment of FIG. 2.

As shown in FIG. 7, a capping plate 202 of cladding material is provided for cladding the fiber carrying surface 188 and for facilitating the coupling of a branch line B to the cavity 50. In this regard, the plate 202 includes a longitudinal groove 204 in its lower surface 206 (the internal surface when capping is completed) for carrying of the branch fiber B. The latter fiber is etched down to a cladding-to-core ratio of 1.6/1 near one end for proper coupling to cavity 50 and may be affixed to the capping plate 202 prior to cementing of the plate to the cane fiber assembly as shown in FIG. 8.

For adjusting the length of the cavities 58 and 66, thin, electrically controlled heating plates (not shown) may be mounted in the capping plate 202 or directly over the fibers. To facilitate this mounting of the heating plates, one or more transverse grooves may be provided in the capping plate or the fiber carrying cane body 181.

To complete the unit, a transmission fiber T is etched down in a coupling area to a 3/1 cladding-to-core ratio and mounted in the groove 190 of the cane to complete the tap unit.

Figure 3:
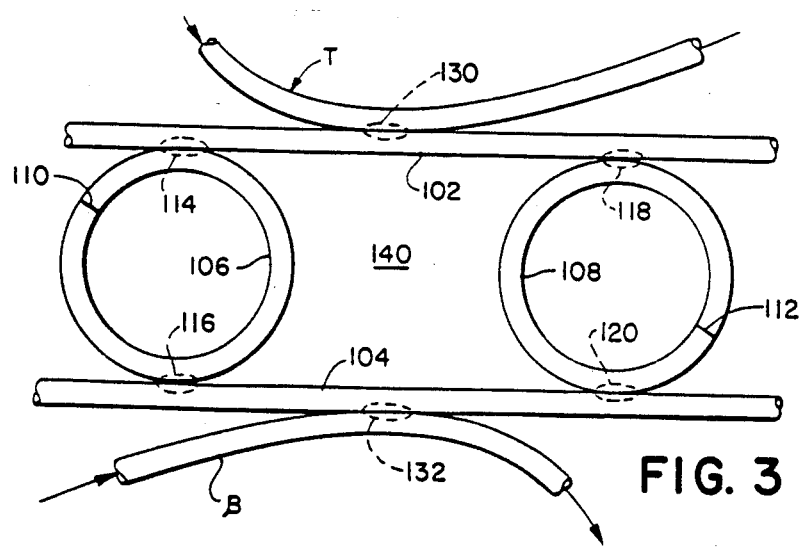
FIG. 3 is a representation of an optical fiber circuit providing three ring cavities, one of which includes and is conditional upon the other two for removing a selected spectral line from an optical fiber transmission line.

A third embodiment of a multicavity optical circuit in accordance with the present invention is illustrated in FIG. 3 and designated generally therein by the reference character 100. As shown, the multicavity optical circuit 100 includes first and second optical waveguide segments 102 and 104 located in a substantially spaced parallel relationship and intercoupled by resonant loops 106 and 108. Each of the resonant loops 106 and 108 is formed as optical waveguide rings, e.g., from selected lengths of optical fiber segments joined end-to-end at butt couples 110 and 112, respectively. Accordingly, each resonant loop 106 and 108 defines an effective optical length that will preferentially support selected wavelength-distinct spectral lines. The resonant loop 106 is laterally coupled to the optical fiber segment 102 through lateral coupling 114 and to the optical fiber segment 104 through lateral coupling 116. In a similar manner, the resonant loop 108 is laterally coupled to the optical fiber segment 102 through the lateral coupling 118 and to the optical fiber segment 104 through a lateral coupling 120. A trunk line T is coupled to the segment 102 through a lateral input coupling 130 in the segment length between, but removed from, the cavity couples 122 and 126. In a similar manner, a branch line B is output coupled at 132 to the segment 104 between the cavity couples of that segment.

Unlike the earlier described embodiments of FIGS. 1 and 2 where resonant energy travels in both directions in the real cavity or cavities, and thus couples into and tends to flow in both directions in the segment thereby providing an adscititious reflectance in that fiber segment, the illustrated ring cavities 106 and 108 have essentially only one direction of resonant energy flow which is in the same direction as the energy flow in the segments 102 and 104 such that no adscititious reflectances are formed. However, in the present embodiment, resonance of the second and third loops 106 and 108 still provide a conditional resonant cavity loop 140 encompassing both cavity loops 106 and 108 and the portions of the segments 102 and 106 coupled therebetween since at any common resonant wavelengths of the loops 106 and 108 a resonant loop 140 can exist in structure 100 with energy flowing across loop 108 along segment 104 to the loop 106, across the latter loop and along the segment 102 back to the loop 108. Preferentially, the second and third loops 106 and 108 are vernier tuned with respect to one another to support essentially only one common resonant wavelength assuming low resonant cavity losses and the spaced coupling distance or length along the segments 102 and 104 is also selected, or tuned, to provide an overall length of the encompassing loop 140 which is coresonant with the second or third loops 106 and 108 at only their coresonant wavelength.

In operation, selected wavelength-distinct spectral lines in the transmission line T are directed past the lateral input couple 130 with a small portion, e.g., 1-2% of the light energy passed into the optical fiber segment 102. The resonantly supported spectral lines will then be passed through lateral couple 118 into the resonant loop 108. Couple 118 is designed to pass a substantial majority of the energy into the loop 108. The energy in the loop 108 is in turn passed, via the couples 120 and 116 into the loop 106 with each of these couples also being designed to pass a substantial majority of the light energy. Since the resonant characteristics of the adscititious loop 140 and of the second and third loops 108 and 106 are configured to resonate at different sets of wavelengths, or may be tuned to do so by stretching or heating or the like, only the wavelength of interest, the one being commonly resonated by all three loops, will continue in the conditional loop 140 and be available as output for tapping from the circuit at couple 132, which may be located at any point on the loop 140. Additional closed loops may be added to the circuit, each structured to have only the desired wavelength in common with the adscititious loop.

In a preferred embodiment of the optical circuit 100, the lateral couples 114, 116, 118 and 120 can have a coupling efficiency of 10-90% with a 50% coupling efficiency preferred; the butt couplings 110 and 112 that close the loops 106 and 108 preferably have a coupling efficiency of greater than 99%; the input coupling 130 can have a coupling efficiency of between 1 and 2%; and the output coupling 132 can have a coupling efficiency of 10-90% with 25% preferred.

As in the case of the embodiments of FIGS. 1 and 2, the optical circuit 100 can be provided with gain by doping a portion of the conditional cavity, for example, the segment 102, with an active gain material and pumping the material in the manner previously described.

Figure 4:
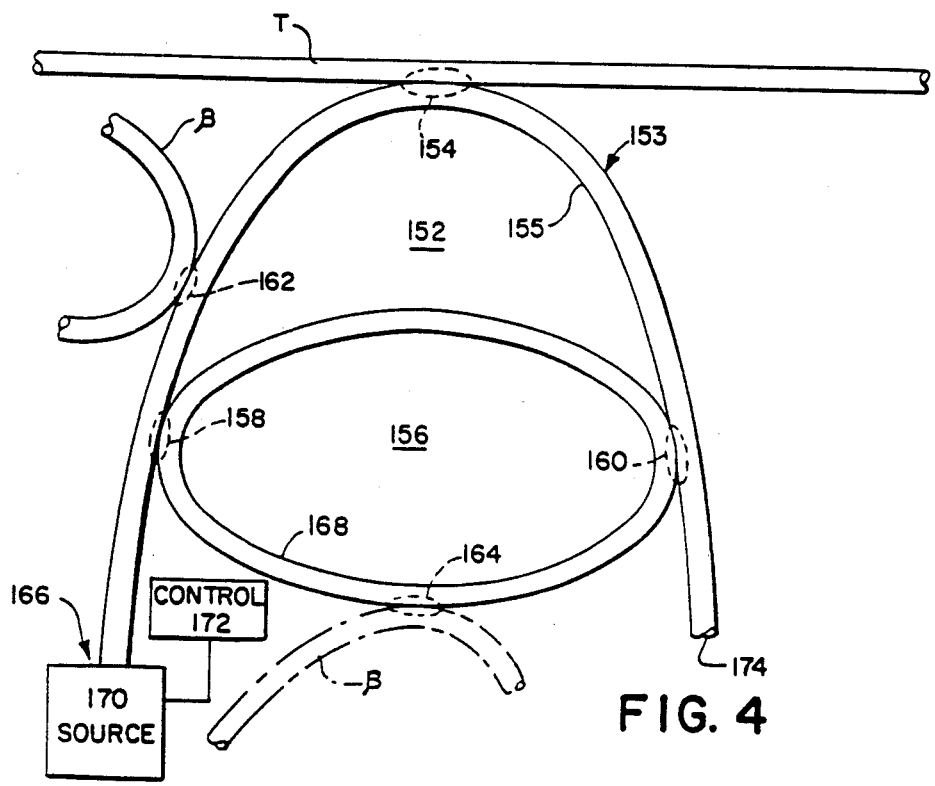
FIG. 4 is a representation of a dual cavity ring structure, one of which is conditional upon the other for removing a selected spectral line from an optical fiber transmission line.
Figure 5:
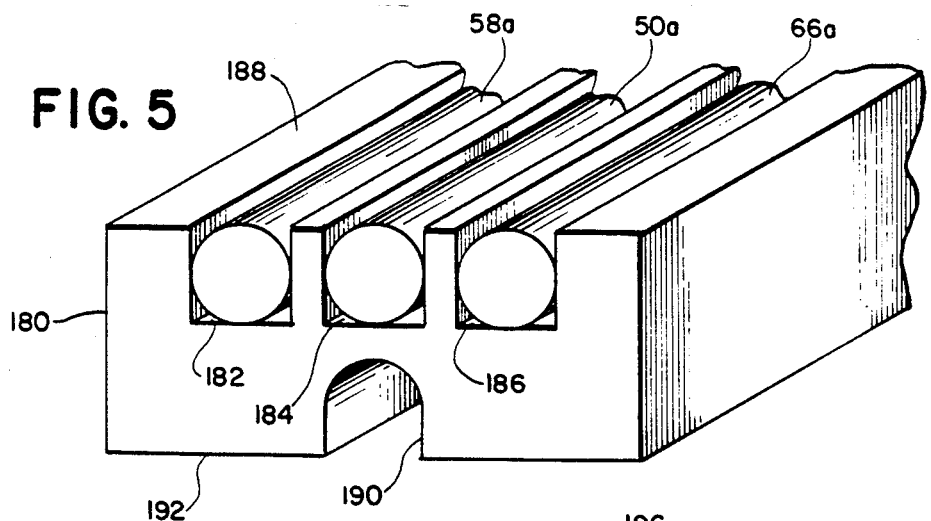
FIG. 5 is a diagrammatic view in perspective of a preform for constructing the multiple cavity arrangement of FIG. 2.

A fourth embodiment of the present invention which utilizes a curvilinear waveguide segment and a real cavity to provide a conditional resonant loop is illustrated in FIG. 4 and designated generally therein by the reference character 150. As shown in FIG. 4, the optical circuit 150 is coupled to a transmission line T that is part of a communications system and which can carry a large number of closely spaced information-bearing wavelengths, typically in the 1.34 micron region of the electromagnetic spectrum. The optical circuit 150 removes a portion of the spectral energy from the information-bearing wavelengths carried in the transmission line T and presents a selected wavelength to a utilization device through a branch line, as described more fully below.

The optical circuit 150 includes a conditional loop 152 including a curvilinear waveguide segment 153 coupled to the transmission line T through a lateral input couple 154, and a second resonant loop 156 that is coupled across the segment 153 (and actually completes the conditional resonant loop 152) through lateral couplings 158 and 160. The second loop 156 is formed from an optical waveguide segment closed upon itself through an end-to-end coupling (not shown) and has resonant characteristics that are a function of its effective optical length. The adscititious loop 152 extends within the segment 153 from the lateral input couple 154 through the lateral coupling 160, the lateral coupling 158 and back to the lateral coupling 154 through the throughput of the second cavity 156. The loop 152 is thus closed only at resonant lines determined by the second cavity 156. Under the condition that one of the resonant lines of the second cavity 156 coincide with or is near one of the resonant lines of the conditional cavity 156, the latter loop achieves resonant characteristics. For clarity of the illustration, the length 155 of the segment 153 between couples 158 and 160 is exaggerated. In practice, as later explained in detail, this length 153 is preferrably only slightly longer than one-half the length of the loop 156.

In operation, a portion of the energy of the information-bearing wavelengths in the transmission line T are transferred through the lateral coupling 154 into the conditional loop 152 which has resonant characteristics controlled by the second loop cavity 156, to preferentially support one or more selected wavelengths which are removed from the circuit through a branch fiber B laterally coupled to the conditional loop 152 through a lateral output couple 162. While far less practical, an output fiber B' (shown in broken line illustration) may be laterally coupled to the second cavity 156 through a lateral coupling 164 to provide an alternate arrangement for removing the resonantly supported wavelengths.

Where it is desired to increase the gain of the preferentially supported wavelength in the circuit 150, a gain or active material may be incorporated into the loop 152 or, that is, in the segment 153 and more specifically the section 156 between the lateral couplings 158 and 160 with one end of the optical fiber segment 153 defining an input port 166 through which pumping light from a suitable pumping source 170, such as a laser diode, can be introduced into the optical fiber segment the amount of pump power being determined by a control circuit 172. The opposite end of the optical fiber segment 153 can function as an energy exit port 174. Thus, as explained in the case of the aforementioned embodiments, the segment 153 (or section 155 thereof) can be provided with a core doped with a gain, or lasing, material that absorbs light energy at one or more absorbing wavelengths and emits light at another emiting wavelength or wavelengths that include the wavelengths preferentially supported within the conditional loop 152. Hence, the source 170 provides means for introducing light energy into the gain material (and thus the cavity 152) to provide amplification of the signals therein and the control 172 provides means for controlling the pump power. Consequently, the pump 170 and the control 172 in conjunction with the gain material provide means, as later explained in detail, for adjusting or varying the bandwidth of the conditional resonance, or that is, of the extracted signal.

As the pumping light energy from the pumping source 170 enters the entry port 166 and passes into the loop 152, the gain material absorbs photons with concomitant increases in electron energy states. Depending upon the gain material utilized, spontaneous emission can occur across a material-specific emission spectra. Since the bandwidth of the wavelengths of interest propagated in the transmission line T lie within the 1.34 micron region of the spectrum, the resonant characteristics of the gain providing loop 152 are such that the preferred spectral line is preferentially supported and provided with an increase in gain. Since the loop 152 and its second resonant cavity or loop 156 are preferably designed to resonate at different sets of wavelengths with only one wavelength (the wavelength of interest) common to both loops, the gain-increased wavelength of interest will be coupled to the branch fiber B through the lateral coupling 162, or in the case of the branch fiber B' through the lateral coupling 164. The gain achieved in the conditional loop 152 can be on the order of 1.15 for 2 mw of the pump power coupled into that loop. The concentration of dopant can be adjusted to absorb most of the pump light in the length of waveguide used.

In operation, the wavelengths of light energy are propagated in trunk line T past lateral couple 154 where a small percentage, e.g., 0.5 to 5%, of the light energy is coupled into segment 153 with a substantial fraction of this energy being passed into loop 156 through the couple 160. As the wavelengths pass into the excited gain material, they will stimulate excited atoms therein to provide in-phase emissions that increase the energy content of wavelengths therein, including, of course, any wavelengths preferentially resonating in the conditional loop 152. The pumping energy provided by the pumping source 170 is controlled so that the gain provided in the loop 152 is substantially linear. Since the conditional loop 152 and real loop 156 are designed to resonate at different sets of wavelengths with essentially only one wavelength common to both loops, the resonating and gain-increased common wavelength will continue in loop 152 for pickup at the couple 162.

In an exemplary embodiment of the optical circuit 150, the section 155 of segment 153 plus the lower portion 168 of the second loop 156 (extending between couples 158 and 160) can have a length of 4.4 cm while the second loop 156 has an overall length of 4.14 cm. The coupling factors for the lateral couples 154, 158, 160 and 162 can be, respectively, 0.05, 0.703, 0.703, and 0.50, and the lateral couples 158, 160 and 162 can have transmission factors of, respectively 0.71, 0.71 and 0.87. The time losses of the loops 152 and 156 are 4% and 2%, respectively, and the gain in the loop 152, as previously noted, can be in the order of 1.15.

With this set of parameters, the phase length exponent ($i^0$) of the conditional loop 152 is as if it were derived from a loop length equal to the length of the segment 153 (between couplings 158 and 160) plus the total length of the second loop 156 and the length of the lower portion 168 of the second loop 156. That is, the total 0 dependence of the loop 152 near resonance is as if it were derived from a waveguide of a length equal to the segment length 155 plus the total length of the loop 156 and the length of its lower portion 168. The length of the segment 153, plus the lower portion 168 of the loop 156 is approximately equal to the second loop length of the loop 156, i.e., 4.14 cm as compared to 4.4 cm, so that it is as if the conditional loop 152 is slightly greater than twice as long as the loop 156.

With these parameters and the suggested gain, we have a line width ($\delta f$) of $5 \times 10^7$ Hertz and a free spectral range ($\Delta FV$) of $5 \times 10^9$ Hertz. The composite free spectral range of the overall tap circuit is about 17 orders of or $85 \times 10^9$ Hertz, with the first adjacent order on each side of the desired coresonant line being reduced to about 50% of the level of the principal line. The power transferred to the branch line at peak is about 15%, and the power removed from the trunk line at peak is about 8%.

Allowing for various losses, with about 2 mw of pump power, the power actually delivered to loop 152 is about 1 mw. The latter has a numerical aperture of 0.2 with the operating wavelength in the region of 1.06 microns for neodymium.

When no gain is used in this embodiment, the line width increases from the above-noted $5 \times 10^7$ Hertz to $1.1 \times 10^8$ Hertz and the free spectral range decreases from the above-noted $5 \times 10^9$ Hertz to $5 \times 10^7$ Hertz.

The peak power transmission also drops to about 2% and the power (at peak) removed from the line is about 2%.

Consequently, changing of the gain by varying the pump power (through the control circuit 172) is a useful means of controlling the bandwidth. In a communications system where some channels carry video and others carry voice, for example, it is useful to be able to adjust the bandwidth of a tap to correspond to any one of several channel bandwidths. The change in transferred power which is also associated with the change in gain can be compensated elsewhere in the receiver.

It should be understood that while the invention herein is described with regard to optical waveguide circuits, illustrated optical fiber waveguides, that other waveguide arrangements can be useful and that the optical systems are not intended to be restricted to fibers, but specifically to include bulk or integrated optical structures.

In the various embodiments described above, the optical circuits have been used for the purpose of removing energy of one of the wavelengths propagated in a transmission line for use by a utilization device. In addition to this use in which the optical circuit functions as a filter/tap, the optical circuits described above can function as line scavengers. For example, various one of the illustrated embodiments may be used as a scavenger tap to reduce residual signals of selected wavelength in a transmission line (from which most of the selected wavelength has been previously removed and utilized) to provide a clear or reasonably quiet channel for subsequent downstream introduction of another signal at that wavelength.

It will be understood that the integral multi-cavity circuit of this invention provides a conditional cavity, which may include a gain medium, to tap a channel of very narrow line width of energy from a trunk line, amplify this channel and vary the extracted bandwidth, and deliver this amplified channel for use as a signal carrier without unduly reducing the free spectral range in the passby and thus minimizing the extraction from the trunk line of the transmission energy of resonant side orders. Thus, it will be appreciated that as a result of the present invention, highly effective optical circuits for processing light energy are provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are ilustrative of preferred embodiments only, not limiting, and that the true spirit and scope of the present invention will be determined by reference to the appended claims.

What is claimed is:

1. A resonant cavity device comprising:
   at least one nonresonant waveguide of predetermined length; and
   a resonant cavity, said nonresonant waveguide and said resonant cavity each being structured and coupled to one another so that said nonresonant waveguide becomes at least part of a resonant structure that is coresonant with said resonant cavity at a predetermined wavelength but only when said resonant cavity itself goes into resonance wherein said nonresonant waveguide includes at least one temporary or adscititious reflectance formed at a coupling region between the resonant cavity and the nonresonant waveguide whereby said device operates as a bandpass filter for only said predetermined wavelength.

2. A resonant cavity device comprising: at least one nonresonant waveguide of predetermined length; and at least one resonant cavity, said nonresonant waveguide and said resonant cavity each being structured and coupled to one another so that said nonresonant waveguide in conjunction with said resonant waveguide become a temporary resonant structure that is coresonant with said resonant cavity at a predetermined wavelength but only when said resonant cavity itself goes into resonance wherein said nonresonant waveguide includes at least one temporary or adscititious reflectance formed at a coupling region between the resonant cavity and the nonresonant waveguide whereby said device operates as a bandpass filter for only said predetermined wavelength.

3. The resonant cavity device of claim 2 wherein aid nonresonant waveguide is further structured for coupling to a multichannel trunk waveguide to extract energy therefrom.

4. The resonant cavity device of claim 3 wherein said nonresonant waveguide is structured for lateral evanescent coupling to the multichannel trunk waveguide.

5. The resonant cavity device of claim 3 wherein said resonant cavity is a linear Fabry-Perot cavity.

6. The resonant cavity device of claim 2 wherein said nonresonant waveguide includes at one end thereof a real mirror and is coupled to said resonant cavity over a coupling region to create an adscititious reflection therein during resonance of said resonant cavity to convert said nonresonant waveguide to a resonant cavity by virtue of the feedback provided by both said real mirror and said adscititious reflection acting in concert.

7. The resonant cavity device of claim 2 wherein said nonresonant waveguide is coupled to said resonant cavity over at least one coupling region to create an adscititious reflection therein during resonance of said resonant cavity to provide feedback in said nonresonant waveguide to convert it to a resonant cavity coresonant with said resonant cavity at said predetermined wavelength.

8. The resonant cavity device of claim 7 wherein said device comprises two Fabry-Perot resonators and wherein said nonresonant waveguide is linear with two free ends with one each of said Fabry-Perot resonant cavities coupled near each free end to provide said adscititious reflections.

9. The resonant cavity device of claim 8 wherein said nonresonant waveguide and said resonant cavities are provided in a generally coplanar arrangement within a block of cladding material with said nonresonant waveguide interposed between said resonant cavities.

10. The resonant cavity device of claim 2 further comprising a multichannel truck line and wherein said nonresonant waveguide is directly coupled to said trunk line.

11. The resonant cavity device of claim 2 wherein said nonresonant waveguide is linear with two free ends and wherein said resonant cavity comprises a closed loop coupled to said linear waveguide over coupling regions adjacent said free ends to integrate said nonresonant waveguide with said resonant waveguide so that they operate to provide said temporary resonant structure when said resonant cavity goes into resonance by virtue of highly efficient energy transfer paths being created in said coupling regions during resonance of said resonant cavity loop.

12. The resonant cavity device of claim 2 wherein said nonresonant waveguide comprises two linear waveguides spatially separated from one another and not directly connected and wherein said resonant cavity comprises two closed loop resonators spatially separated from one another and not directly coupled to each other, each of said closed loop resonators being coupled respectively to each of said nonresonant linear waveguides over two coupling regions which become highly efficient energy transfer couplings during resonance of said closed loop resonators to provide said temporary resonant cavity.

13. The resonant cavity device of claim 2 further including an active gain material incorporated into at least said nonresonant waveguide and optical pumping means to act in cooperation with said active gain material to amplify said signal at said predetermined wavelength.

* * * * *